United States Patent Office 3,113,394
Patented Dec. 10, 1963

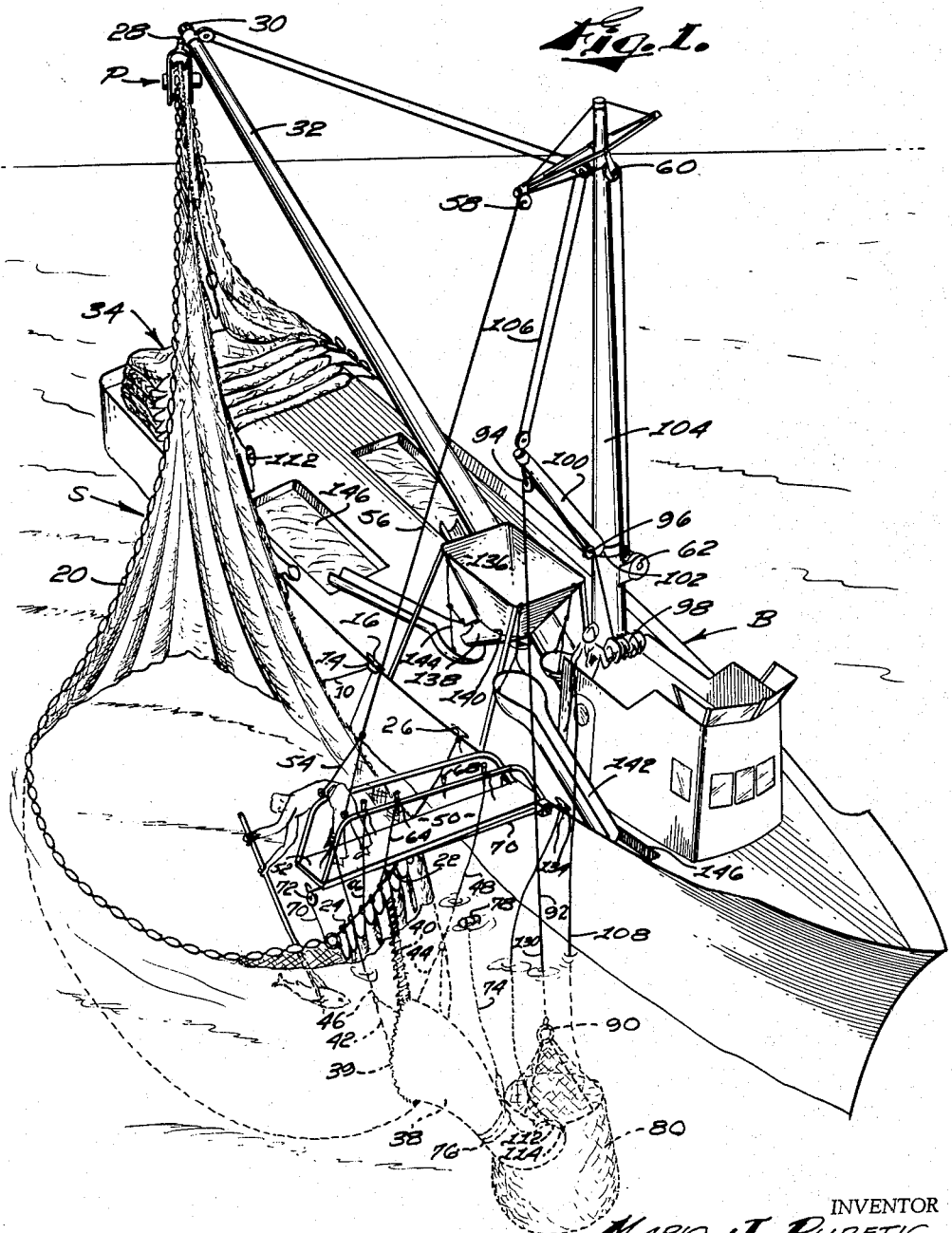

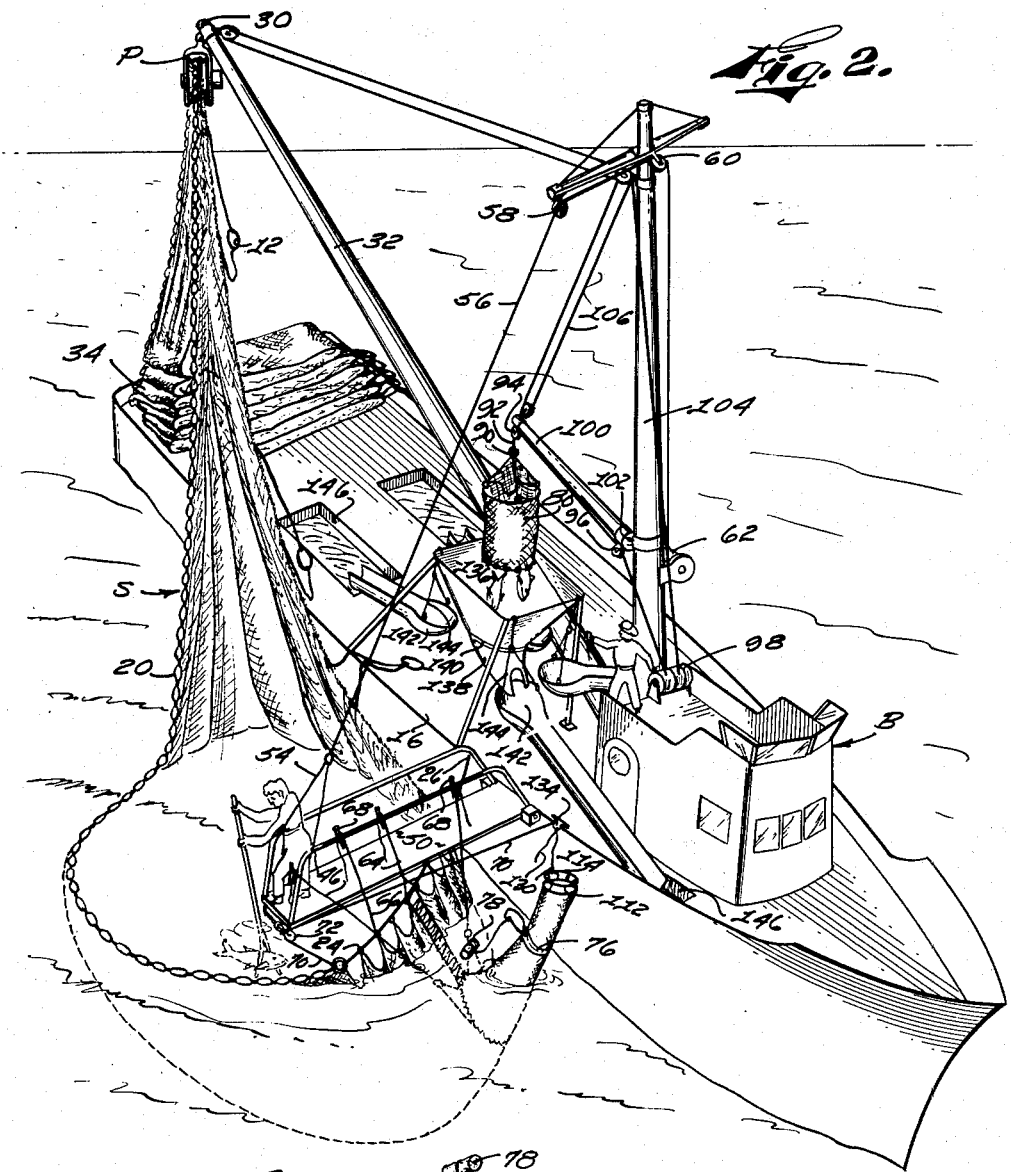

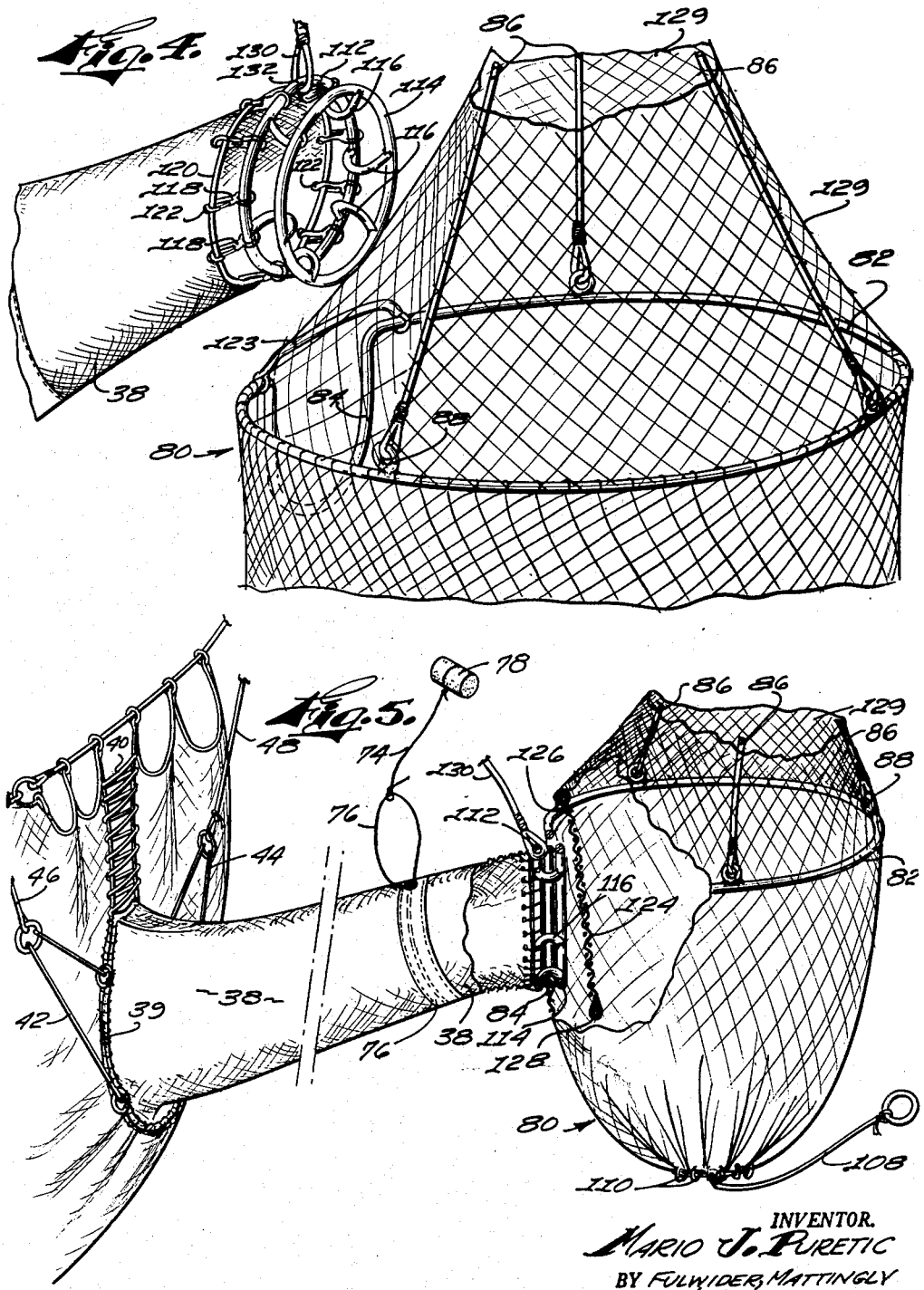

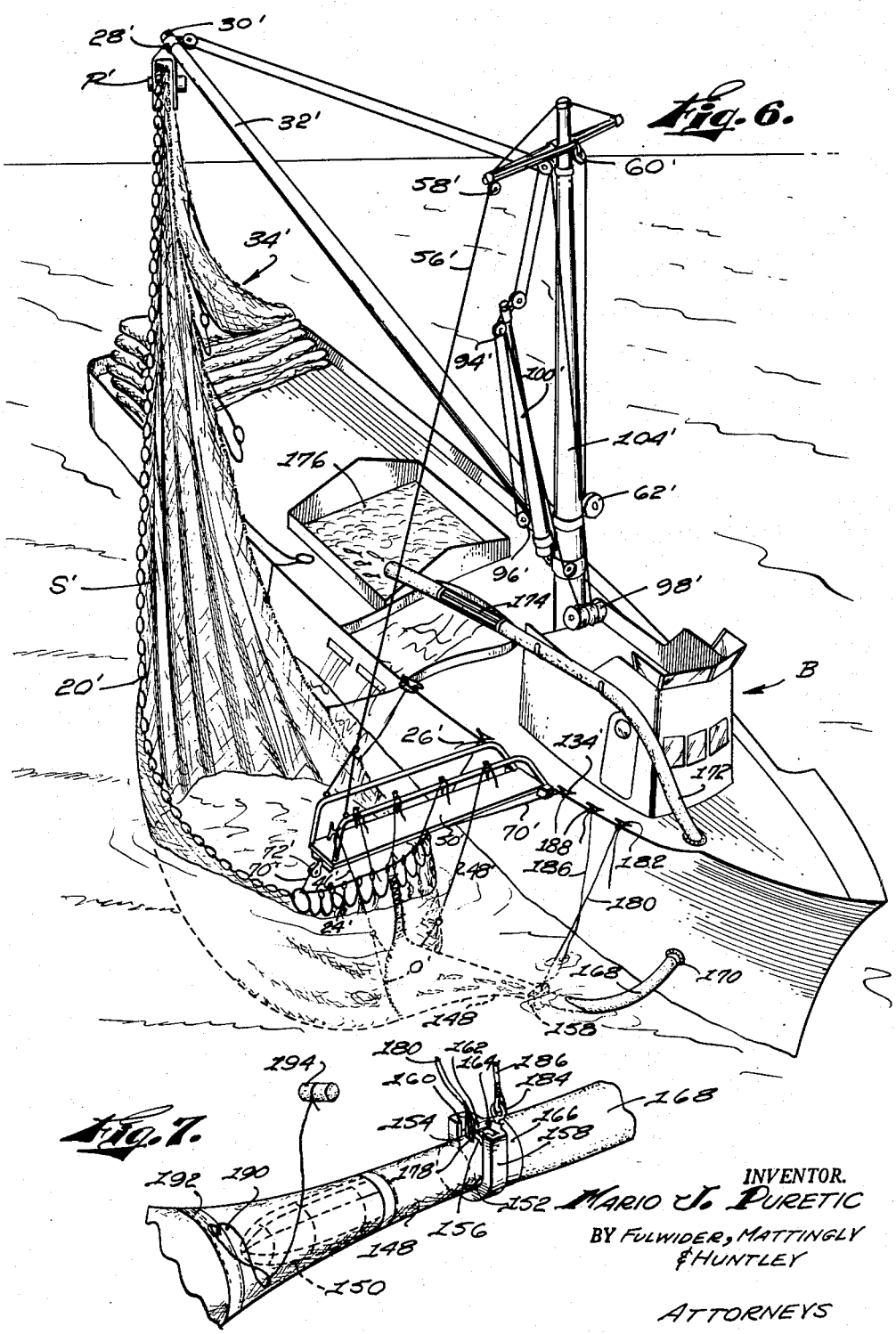

3,113,394
APPARATUS FOR TRANSFERRING FISH FROM A SEINE TO THE HOLD OF A SHIP
Mario J. Puretic, 30514 Avenida Corona, San Pedro, Calif.
Filed Apr. 18, 1960, Ser. No. 22,741
5 Claims. (Cl. 43—6.5)

This invention relates generally to apparatus for fishing and particularly to a manner of recovering fish from a net.

One of the main objects of the invention is to provide a new apparatus for rapidly transferring netted fish from a pursed seine net into the hold of a fishing boat.

Fishing is one of the oldest arts and comparatively little has been done over the years to change methods that have been followed for centuries. When manpower is abundant, there is little reason for lessening the crews of commercial fishing boats. When labor is costly as it is in the United States and elsewhere in certain countries, then it becomes necessary for commercial fishermen to compete with low-paid foreign crews. In my Patent No. 2,733,531 there is disclosed and claimed a power-driven block adapted to be suspended from the derrick of a fishing boat to expedite the hauling-in of the purse seine. Where such power-driven block is employed, commercial fishing boat crews have often been reduced substantially one half. The use of this power-driven block permits the netted fish to be brought alongside the fishing boat in a rapid manner but the final recovery of the fish from the seine and transfer into the fishing boat hold still presents an important problem.

The standard procedure of hauling in the seine manually by a large crew working on deck and in boats or by a power block results in a fish-filled open net alongside the boat. The fish are scooped or brailed from the small shallow net opening either by manual brailing or by pump-driven water suction conduits. There is no gradual recovery and transfer of the fish to the boat hold. It is a matter of last minute mass jamming of the fish in a shallowed net and recovery and transfer to the hold often resulting in damage to the fish.

It is a main object of the present invention to provide a novel apparatus for directing all sizes of fish into a pocket or sleeve of the net or seine alongside the boat and then recovering the fish and transferring them either by basket or water conduit rapidly into various compartments in the boat hold. This object also includes co-operation with a power driven block which upon elevation of the seine gradually induces water circulation and fish flow toward the pocket so that the fish are gradually and continuously urged into the pocket and recovered therefrom in a manner to entirely avoid last minute mass jamming or partial destruction of the fish.

In carrying out one embodiment of the present invention, fish are directed into the pocket of the seine or net by simultaneous elevation of the other end of the seine. The pocket is associated with a submerged detachable basket that receives the fish and upon derricked elevation disposes the fish in a common hopper from which they are delivered to various storage compartments on the boat. One or more fish delivering baskets may be used and these baskets are continuously filled and dumped in a speedy manner. It is intended that power-driven winches and derricks may be used for elevating the basket nets to common hoppers on the boat deck and the fish directed by troughs to the various storage compartments. In another embodiment of the invention fish are directed to the pocket in the net by elevation of the other end of the seine in the same manner. However, the pocket is surfaced alongside the boat and a water suction conduit attached thereto. The fish are then withdrawn through the suction conduit by a power-driven pump and finally disposed in compartments in the boat hold. Conventional means are provided for draining the water from the fish prior to disposal in the hold.

It is standard procedure to scoop fish from a shallowed open net and derrick them to the fishing boat. This is done by using a large skiff outside the net and scooping from an open boat. This laborious operation must be accomplished from a skiff that is usually pitching heavily in high seas. It is a dangerous job requiring great experience and tremendous strength.

With the apparatus of the present invention, the skiff need not be used for fish transfer and may be utilized instead to hold the fishing boat into the wind or swells and thereby moderate the boat pitch to make fish transfer easier and quicker. The basket net when attached to the fish pocket is submerged in the swells and rides with them in a manner to permit a crewman on the deck to rapidly and safely derrick the basket onto the boat and return it to operable connection with the pocket. The present method and apparatus for transfer of fish to the hold is more economical and requires a smaller crew than any practice known heretofore.

Speeding the fishing operation is the main basis for the present invention. There are many difficulties attending the sighting of a fish school and the seining and recovery thereof. Fish schools are not as plentiful as in years past and when sighted it is highly desirable to quickly run the seines, capture the fish and transfer them rapidly to the hold so that the school may be quickly followed and more fish captured. Many expensive means such as airplanes have been used to sight and keep a fish school in sight. Little has been done other than the development of the aforementioned power block for expediting fish capture and transfer to the boat compartments or hold.

Another object of the invention is to speed fish transfer by providing a closed pocket or sleeve in the net that can be lifted to the surface and quickly connected to a fish conduit or detachable basket net.

Still another object of the invention is to provide a closed pocket in a purse seine that may be manually lifted to the surface and quickly connected to a pump actuated fish conduit.

Another object of the invention is to provide a purse seine with a closed pocket or sleeve that may be lifted to the surface and opened into a detachable bag net for fish transfer into fish boat compartments.

Yet another object of the invention is to provide a purse seine with a closed pocket or sleeve that may be lifted to the surface and opened into a power actuated water conduit for transfer of the fish into fishing boat compartments.

With the foregoing objects in view, and such other objects and advantages as will become apparent to those skilled in the art to which this invention relates as this specification proceeds, the invention consists essentially in the arrangement and construction of parts all as hereinafter more particularly described, reference being had to the accompanying drawing in which:

FIGURE 1 is a perspective view showing a pursed seine being elevated by a power block and large fish directed to a sub-surface net pocket detachably connected to a basket net in accordance with one embodiment of the present invention;

FIGURE 2 is a perspective view similar to FIGURE 1, the net pocket being snubbed to the boat while the elevated basket is being dumped into a hopper having connection with plural troughs that deliver the fish to desired storage compartments on the boat;

FIGURE 3 is a partial perspective view in enlarged scale showing the manner of closing the purse seine pocket so that it may be opened for detachable connection on the basket net;

FIGURE 4 is a partial perspective view showing the net pocket separated from the basket net;

FIGURE 5 is a partial perspective view showing the net pocket and basket net in attached position;

FIGURE 6 is a perspective view showing the pursed seine being elevated by a power block and small fish being directed to a net pocket that has been previously connected to a power actuated fish conduit; and FIGURE 7 is a partial perspective view showing the manner of securing the opened net pocket to the fish conduit.

Referring to the drawings, FIGURES 1 through 5 inclusive show one method and apparatus for transferring fish from a pocket in a pursed seine to a quickly detachable basket net and thence to fish storage compartments in a fishing boat in accordance with the present invention. FIGURES 6 and 7 show an alternate method and apparatus for transferring fish from a pocket in a pursed seine to a surface-attached fish conduit and thence to storage compartments in a fishing boat. In both instances, the pursed seine is being elevated at its opposite end to provide water circulation that forces the fish gradually and continuously into the surfaced open net pockets that were initially closed during the conventional fish capturing or seining operation.

Purse seining of fish is an old and conventional method that comprises the tightening of the purse or lead line or cable through rings attached to the seine net below the chain or lead line. The purse or lead line and rings are hauled aboard the fishing boat and the closed net buoyed by the float line stretched out alongside the boat. FIGURE 1 shows the purse or lead line 10 and several of the rings 12, one of which 14 is shown snubbed to a cleat 16 on the fishing boat generally referred to as B. The float line 20 buoys the seine or net S alongside the boat B. A line 22 passing through rings 24 closes the end of the net and is shown snubbed to a cleat 26 on the boat B.

A power block generally referred to as P, of the type shown in my aforementioned Patent No. 2,733,531 is controllably connected at 28 to the outer end 30 of boom 32. It may be assumed that the power block P may be operated to winch aboard the net S, purse line 10, purse rings 12, lead line 18, snub line 22, rings 24 and float line 20 when desired and with variations of said operation.

As far as the present invention is concerned, the elevation of one end of the seine S as shown in FIGURE 1 is important. Rapid hauling of the seine S aboard and orderly deposit at 34 on the stern deck creates a water flow and fish movement toward the other end of the seine S. In the purse seine applicant has formed with or secured thereto a fish pocket or sleeve 38. The pocket or sleeve 38 may be fashioned in various ways but a preferred form for large fish such as tuna and the like is shown in FIGURE 5. The pocket 38 is preferably formed of canvas and is laced to the seine S as indicated at 39 in a manner to prevent any defacement thereof. An open net space above the pocket 38 is cross-laced at 40 to prevent escape of the large fish in the seine S. Dual bridles 42 and 44 attached to either side of the pocket 38 spread the open seine end of the pocket by means of dual lines 46 and 48 attached to the spaced ends of a railed platform 50. The platform 50 is suspended from the boat B during the fish transfer operation and the outer end 52 thereof has a bridle 54 connected to a cable 56 that passes upwardly over mast supported pulleys 58 and 60, thence downwardly to a constant torque hydraulic motor and winch 62 operating in a manner to compensate for the roll of the boat and maintain the platform at a substantially constant elevation over the ocean swells. Lines 64 and 66 connected to rings 24 and attached to spikes 68 on the platform 50 provide additional means for supporting the end of the seine and keeping the pocket 38 open and free for fish passage therethrough. Another line 70 connects one of the rings 24 with a pulley 72 on the outer under end of the platform 50 and thus tending to stabilize the platform as well as support the seine end.

It is essential during the seining and pursing operation that the fish pocket 38 be closed to prevent escape of the surrounded fish. Therefore, a releasable tie rope 74 and band 76 are shown in FIGURE 3 for closing and opening the sleeve 38. Small floats or buoys 78 are secured to the tie ropes 74 so that they may be readily located and retrieved. When the seine S has been brought alongside the boat B, a crewman surfaces the pocket 38 and releases the tie rope 74. FIGURES 4 and 5 show in detail the quick detachable connection of a basket net 80 and the opened fish pocket or sleeve 38. Large fish such as tuna and the like cannot readily be transferred to the fish boat B by means of a fish conduit. Applicant therefor desires to hasten the fish transfer operation by providing the basket nets 80 which may be derricked aboard as shown in FIGURE 2. The baskets 80 may be fashioned in various ways, but a preferred embodiment is shown in FIGURES 4 and 5. The basket net 80 has an upper lace attached ring 82 that has a depending semi-circular attachment portion 84. Plural bridles 86 are connected to eyes 88 which in turn are attached to the basket ring 82. The bridles 86 are secured at 90 to a cable 92 that passes through pulleys 94 and 96 to a manually controlled compensating conventional power winch 98. A derrick 100 swingably mounted in the usual manner at 102 at the mast 104 has its movement controlled by standard cables 106. It is apparent that the fish-filled basket 80 of FIGURE 1 may be quickly derricked aboard and dumped by means of a bottom purse string 108 and rings 110.

The power winch 98 has a standard built in slip-friction mechanism that insures smooth elevation of the basket 80 and obviates any possibility of breakage of cables and other elements due to jerky basket transfer and rolling of the boat.

The quick detachable connection between the basket 80 and the fish pocket 38 permits the transfer of large fish to the boat B to be accomplished in a minimum period of time. A fish pocket attachment member comprises dual spaced rings 112 and 114 that are connected by multiple curved arms 116. The arms 116 are fashioned in a semi-circular manner to engage and mate with the semi-circular portion 84 of the ring 82. The ring 114 may be made of aluminum tubing of a size that would make it buoyant and thus obviate the use of floating buoys. The ring 112 is connected to the outer end of the pocket 38 by a quick detachable mechanism. A plurality of snap hooks 118 carried by the ring 112 are detachable relative to a rope 120 secured at the open end of pocket 38, as shown in FIGURE 4. This type of connection permits the attachment ring to be detached before the end of the seine S and pocket 38 are finally hauled through the power winch and onto the deck. A rope latch 123 is slipped over the buoyant ring 114 so that the basket 80 when submerged will not become disconnected from the sleeve 38.

A fish valve for the basket 80 is shown in FIGURE 5. A net portion 124 secured to the rim 82 of the basket 80 at 126 is held over the inner open end of the pocket 38 by means of a weight 128. The fish are thus able to enter the basket 80 but are prevented from returning to the pocket 38. A net cover 129 for the basket prevents any possibility of fish escape when the basket 80 is submerged during the fish transfer operation. A cable 130 is connected at 132 to the ring 112 and provides means for manually releasing the pocket 38 from the basket 80 when same is filled with large fish. The crewman raises the pocket 38 as shown in FIGURE 2 and snubs it to a cleat 134 on the boat B while the basket 80 is being derricked aboard. When the basket is returned, the attachment member is manually dropped into place and the pocket 38 and basket 80 returned to submerged surface operating position as shown in FIGURE 1. It is contemplated that more than one basket 80 will be used to further hasten the fish transfer. The detachable connecting operation would be exactly the same.

In FIGURE 2, the large fish are shown being dumped from the basket net 80 into a common hopper 136. A spout 138 is rotatably and adjustably attached at 140 to the bottom of the hopper 136. The fish can thus be directed to any one of the plural open troughs 142 secured by bridles 144 to the hopper 136. The troughs 142 communicate with various hatches 146 opening into storage compartments below deck.

The fish transfer method by means of the apparatus disclosed in FIGURES 1 through 5 inclusive greatly speeds the fishing operation. The rapid elevation of one end of the net S and attached parts by means of the power block P forces water toward the pocket end of the seine. The water movement tends to gradually and continually force the large fish into the pocket 38 that has been previously hauled to the surface, opened and detachably connected to the basket net 80. When the basket 80 is filled with fish, the crewman snubs the sleeve 38 to the boat to prevent escape of fish therein. When the basket 80 has been dumped, it is returned to the water surface where the pocket 38 is quickly attached thereto. The weight of the net S holds the attachment yoke of the pocket 38 in secure engagement witht the basket 80.

Referring to FIGURES 6 and 7, another form of the invention is disclosed. The drawing shows similar disposition of the net alongside the fishing boat and similar but primed net indication numbers. The seine S' is being elevated by the power block P' in exactly the same manner. The fish transfer from the pocket or sleeve is different because the method and apparatus has been adapted for use in connection with small fish. The net elements and operation thereof are the same as before described with the exception that the fish pocket or sleeve 148 is smaller because the seining operation is for small fish.

The fish pocket or sleeve 148 may be made in various ways but a preferred embodiment of the invention is disclosed in detail in FIGURE 7. An open barred cage or large screen 150 is disposed in the pocket 148 in a manner to prevent large fish from entering the suction conduit, later to be described. A metal inner sleeve 152 forms the open end of the pocket 148 and is laced or otherwise connected thereto at 154. A circular flange 156 on the sleeve 148 is adapted to be detachably received in an attachment plate or yoke 158 recessed at 160 for mating reception of the flange 156. A latch 162 pivoted to the yoke 158 at 164 provides means for locking the flange 156 in the mating recess 160. The yoke or recessed plate 158 has a rearwardly extending sleeve 166 that is fixedly secured to the outer suction end of a flexible fish conduit 168. The conduit 168 enters the fish boat at 170 and is operably connected with conventional below-surface power actuated pumps (not shown) that draw the fish and water through the conduit and pumps into another section 172 of the fish conduit. The water is drained from the conduit by means of a retriculated section 174 in the conduit 172 and the fish are forced into a storage compartment or compartments 176 below the deck.

A ring 178 on the sleeve 152 provides a connecting means for a snub or control cable 180 attached to a cleat 182 on the boat B. A ring 184 on the sleeve 166 has a control cable 186 secured thereto, the other end of the cable being attached to a cleat 188 on the boat B. It is necessary that the pocket 148 be closed during the seining and pursing operations and therefore a releasable tie rope 190 and band 192 for closing and opening the fish pocket 148 are provided as shown in FIGURE 7. A float or small buoy 194 provides means for locating and rapidly recovering the tie rope 190.

Assuming that the seine S' has been pursed and power winched alongside the boat as shown in FIGURE 6, the operator hauls the fish pocket 148 to the surface by means of the cable 180. The pocket 148 is snubbed to the boat while the tie rope 190 is released to open the sleeve or pocket 148. The operator then draws the outer end of the fish conduit 168 toward the fish pocket 148 by means of the cable 186. The flange 156 of the pocket 148 is then dropped into the recess 160 in the yoke 158 and the latch 162 secured over the upper end of the flange 156. The connected open ended fish pocket 148 and conduit 168 are then lowered to the surface as shown in FIGURE 6. The pumps are started and water and fish are induced through the suction conduit 168, below surface pumps and conduit portions 172 and 174. The fish are deposited in desired storage containers or compartments below deck. At the same time the power block P is continuously elevating the seine and attached elements as shown in FIGURE 6. The water and fish are gradually forced toward the pocket or sleeve 148. The movement is such that the fish are not mass jammed at the last minute into the sleeve. They are continuously carried thereto in a steady manner. The fish transfer is fast and the seine is piled on the stern in a controlled manner. It is possible with the present fishing method and apparatus to accomplish the seining and fishing transfer operations at greater speed than has been possible heretofore.

The method and apparatus shown in FIGURES 6 and 7 speeds the transfer of netted fish to the boat storage compartments beyond that of any prior practice. The disclosure in the present application follows the theory, method and apparatus of applicant's abandoned application Serial No. 669,475, filed July 2, 1957 for Method for Transferring Fish from a Seine to the Hold of a Ship. The present application is therefore a continuation-in-part of said application.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for use with a ship for transferring fish from a net to said ship, comprising: an elevated support on said ship; a power block on said elevated support; a net adapted to be power-elevated out of the water by said power block for folded disposal on said ship; means operatively associated with said net to form a pocket in said net, with a suction conduit-receiving opening being formed in the closed end of said pocket; and a suction conduit attachable in said opening of said pocket for withdrawing fish and water from said pocket into said ship while said net is being power-elevated onto said ship.

2. Apparatus for use with a ship in capturing fish and transferring said fish to the hold of said ship, comprising: a seine that may be pursed to provide a bag closed at the top and bottom with a closed portion of said seine forming a fish-receiving pocket at one end of said seine; power-operated seine hoisting means on said ship to elevate the end of said seine opposite said pocket out of the water for folded disposal upon said ship; means operatively associated with said seine for forming a suction conduit-receiving opening in the portion of said seine defining a pocket; and a suction conduit attachable in said opening for withdrawing fish and water from said pocket into the hold of said ship while said seine is being hoisted onto said ship.

3. Apparatus for use with a ship in capturing fish and transferring said fish to the hold of said ship, comprising: a seine that may be pursed to provide a bag closed at the top and bottom with a closed portion of said seine forming a fish receiving pocket at one end of said seine; an elevated support on said ship; a power block on said support, said power block and support cooperating to elevate the end of said seine opposite said pocket out of the water for folded disposal upon said ship; means operatively associated with said seine for forming a suction conduit-receiving opening in the portion of said seine defining a pocket; and a suction conduit attachable in said opening for withdrawing fish and water from said pocket into the hold of said ship while said seine is being power-elevated onto said ship.

4. Apparatus for use with a ship for transferring fish from a net to said ship, comprising: an oscillating derrick mast on said ship; a power-actuated pulley on said mast; a net adapted to be power-elevated out of the water by said mast and pulley for folded disposal on said ship; a manually controlled fish sleeve having a conduit engageable end secured to said net and extending therefrom; and a suction conduit having a sleeve engaging end portion adapted to engage said conduit engageable end for withdrawing fish and water from said sleeve into said ship while said net is being power-elevated onto said ship.

5. Apparatus for use with a ship in capturing fish and transferring said fish to the hold of said ship, comprising: a seine that may be pursed to provide a bag closed at the top and bottom; a sleeve secured to said seine and extending therefrom, said sleeve having a fish cage therein, means for manually opening and closing said sleeve, and a rigid open end with conduit engaging flange; an elevated support on said ship; a power block on said support, said power block and elevated support cooperating to elevate the end of said seine opposite said sleeve out of the water for folded disposal upon said ship; and a suction conduit having an attachment end for quickly receiving and releasing said sleeve flange, said conduit withdrawing fish and water from said sleeve into said ship while said seine is being power elevated onto said ship.

References Cited in the file of this patent
UNITED STATES PATENTS

| | | |
|---|---|---|
| 441,070 | Ketcham | Nov. 18, 1890 |
| 1,070,232 | Curol | Aug. 12, 1913 |
| 1,133,120 | Fountain | Mar. 23, 1915 |
| 1,332,653 | Wakefield | Mar. 2, 1920 |
| 1,361,691 | Davis | Dec. 7, 1920 |
| 2,733,530 | Puretic | Feb. 7, 1956 |
| 2,736,121 | Kimmerle | Feb. 28, 1956 |
| 2,859,882 | Puretic | Nov. 11, 1958 |
| 2,875,546 | Weathersby | Mar. 3, 1959 |